(12) United States Patent
Armando et al.

(10) Patent No.: US 7,997,101 B2
(45) Date of Patent: Aug. 16, 2011

(54) MOLD ACTUATING AND COOLING ASSEMBLY FOR A GLASSWARE MOLDING MACHINE

(75) Inventors: Lorenzo Armando, Cuneo (IT); Gianclaudio Borsarelli, Cuneo (IT); Carlo Sesia, Cuneo (IT)

(73) Assignee: Bottero, S.p.A. (IT)

( * ) Notice: Subject to any disclaimer, the term of this patent is extended or adjusted under 35 U.S.C. 154(b) by 491 days.

(21) Appl. No.: 12/167,489

(22) Filed: Jul. 3, 2008

(65) Prior Publication Data

US 2009/0025429 A1 Jan. 29, 2009

(30) Foreign Application Priority Data

Jul. 6, 2007 (IT) .............................. TO2007A0495

(51) Int. Cl.
*C03B 9/38* (2006.01)
*C03B 9/347* (2006.01)
*C03B 9/00* (2006.01)

(52) U.S. Cl. ............................... 65/355; 65/227; 65/229
(58) Field of Classification Search ................... 65/137, 65/227–229
See application file for complete search history.

(56) References Cited

U.S. PATENT DOCUMENTS

| | | | |
|---|---|---|---|
| 4,462,519 A | 7/1984 | Parkell et al. | |
| 4,466,532 A | 8/1984 | Minneman et al. | |
| 4,502,721 A | 3/1985 | Savin-Czeizler et al. | |
| 4,655,813 A * | 4/1987 | Nebelung | 65/359 |
| 4,927,444 A | 5/1990 | Voisine | |
| 5,324,340 A | 6/1994 | Withrow et al. | |
| 5,429,651 A | 7/1995 | Bolin | |
| 5,649,991 A * | 7/1997 | Jones | 65/229 |
| 5,733,354 A | 3/1998 | Voisine et al. | |
| 5,741,343 A | 4/1998 | Lloyd et al. | |
| 5,755,847 A | 5/1998 | Quayle | |
| 5,988,355 A | 11/1999 | Merour | |
| 5,992,612 A | 11/1999 | Sidler et al. | |
| 6,151,918 A | 11/2000 | DiFrank et al. | |
| 6,494,063 B1 | 12/2002 | Malek | |
| 6,601,410 B1 | 8/2003 | Bogert et al. | |
| 6,668,591 B2 | 12/2003 | Flynn | |
| 6,702,097 B1 | 3/2004 | Leidy et al. | |
| 7,047,766 B2 | 5/2006 | Schneider et al. | |
| 7,278,529 B2 | 10/2007 | Borsarelli et al. | |
| 7,320,230 B2 | 1/2008 | Lockhart | |
| 7,325,668 B2 | 2/2008 | Borsarelli et al. | |
| 7,681,711 B2 | 3/2010 | Borsarelli et al. | |

(Continued)

FOREIGN PATENT DOCUMENTS

DE 29922204 3/2000

(Continued)

OTHER PUBLICATIONS

Background of the Invention for the above-captioned application filed Jul, 3, 2008 (previously provided).

*Primary Examiner* — Matthew J Daniels
*Assistant Examiner* — Jodi Cohen
(74) *Attorney, Agent, or Firm* — Sheridan Ross P.C.

(57) ABSTRACT

In a glassware molding machine, the half-molds of a mold are moved between an open position and a closed position and cooled by an actuating and cooling assembly having a fixed supporting structure and, for each half-mold, a respective supporting and actuating arm fitted to the relative half-mold and hinged to the fixed supporting structure to rotate about a fixed hinge axis; each supporting arm internally defining a chamber communicating with a ring of cooling conduits formed through the half-molds, and the chamber having an inlet formed through an outer lateral wall of the supporting arm to receive cooling air from a compressed-air tank of the machine.

10 Claims, 3 Drawing Sheets

U.S. PATENT DOCUMENTS

| | | |
|---|---|---|
| 7,854,312 B2 | 12/2010 | Borsarelli et al. |
| 2006/0179884 A1 | 8/2006 | DiFrank et al. |
| 2008/0209951 A1 | 9/2008 | Armando et al. |
| 2008/0282739 A1 | 11/2008 | Cramer |
| 2009/0000337 A1 | 1/2009 | Cramer |

FOREIGN PATENT DOCUMENTS

| | | |
|---|---|---|
| EP | 1213487 | 6/2002 |
| EP | 1772436 | 4/2007 |
| GB | 2292551 | 2/1996 |

* cited by examiner

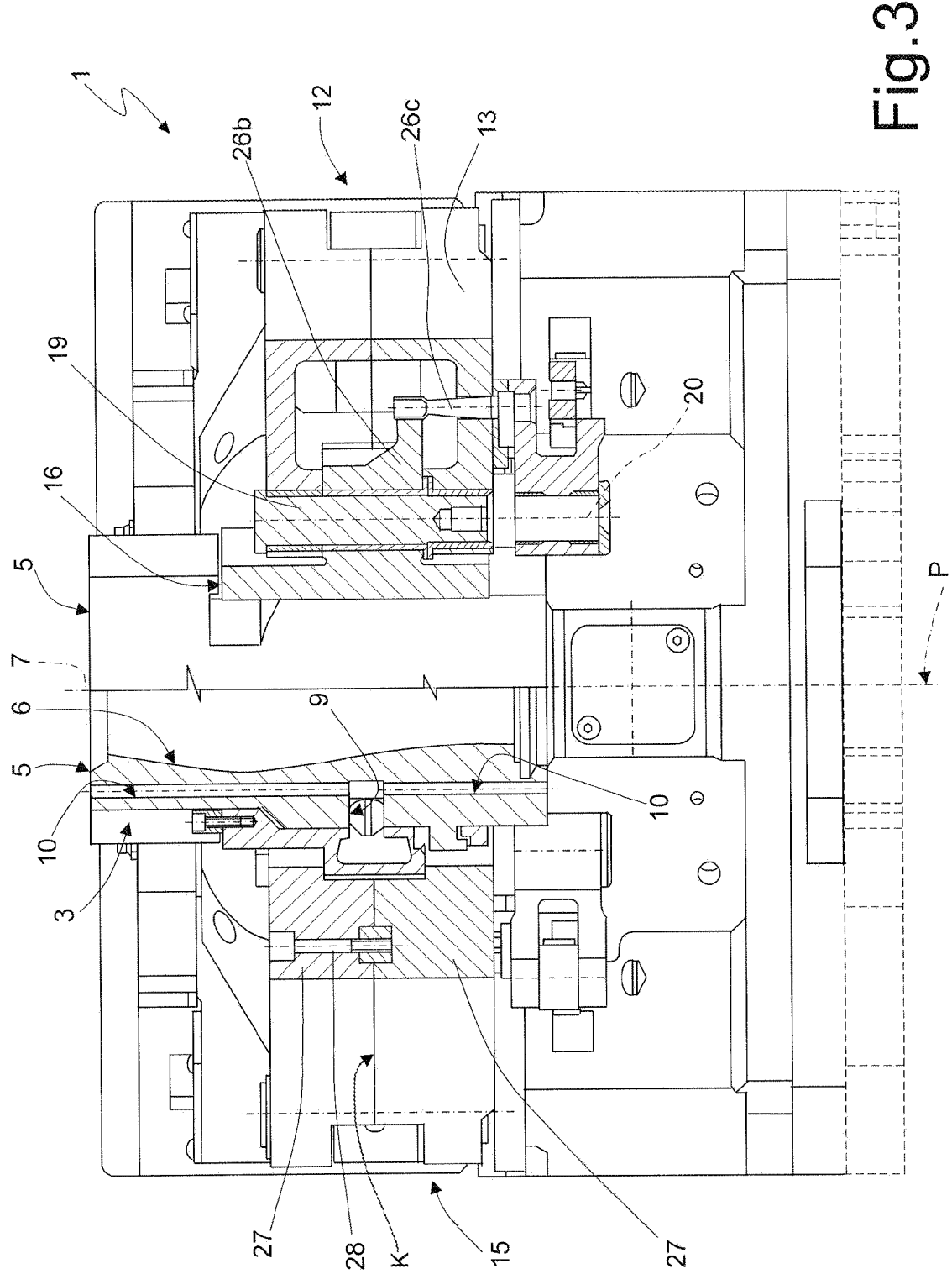

MOLD ACTUATING AND COOLING ASSEMBLY FOR A GLASSWARE MOLDING MACHINE

FIELD OF THE INVENTION

The present invention relates to a mold actuating and cooling assembly for a glassware molding machine.

BACKGROUND OF THE INVENTION

In glassware molding, so-called I.S. molding machines are used, which comprise a number of side by side molding sections, each for producing a succession of products. Each molding section in turn comprises a rough mold, normally with a row of adjacent cavities, each for receiving a glass gob and forming a respective semifinished article, which is transferred to a finish mold by an invert mechanism.

Each rough mold comprises two half-molds movable with respect to each other between a closed position defining the row of cavities, and an open position to remove the semifinished articles.

The half-molds are moved between the open and closed positions by a mold opening/closing assembly which, for each half-mold, comprises a lateral actuating arm hinged at one end to a fixed structure, fitted at the other end to the relative half-mold, and of the type described, for example, in Italian Patent Application n. TO2007A000090 filed on 7 Feb., 2007 by the present Applicant, and to the pertinent parts of which full reference is made herein for the sake of clarity.

The molds are normally cooled by a mold cooling device, which draws cooling air from a pressurized air chamber normally formed in the bed of the machine, and feeds it to the molds. This is done in various ways. In one solution, the air chamber has an opening underneath the molds, through which air is fed upwards and flows over the half-molds in the closed position. This solution is unsatisfactory, by failing to provide for thorough, continuous cooling of the molds.

In an alternative solution described, for example, in European Patent EP 0 576 745 B1, air is fed into an intermediate lateral chamber of the half-molds, in which terminate two rings of opposite vertical conduits, by a telescopic feed device, which is supplied with air from the air chamber in the machine bed, and feeds it into the intermediate chamber of the relative half-mold.

This solution is extremely complicated constructionwise, by having to ensure airtight sealing of the various parts in relative motion when moving the half-molds between the open and closed positions. Moreover, it is bulky, and involves painstaking adjustments whenever the molds are changed. For all these reasons, the above known solutions are extremely expensive to produce and adjust.

SUMMARY OF THE INVENTION

It is an object of the present invention to provide a mold actuating and cooling assembly for a glassware molding machine, designed to provide a straightforward, low-cost solution to the above drawbacks, and which at the same time is compact, highly efficient, and reliable.

According to the present invention, there is provided an actuating and cooling assembly for a mold of a glassware molding machine, the mold comprising two half-molds, each of which has a number of through cooling conduits and defines an annular intermediate chamber communicating with respective inlets of said cooling conduits; the assembly comprising a supporting structure, and actuating means for moving the half-molds with respect to each other between a closed position and an open position; said actuating means comprising, for each said half-mold, a respective supporting and actuating arm connected to the relative half-mold and hinged to the fixed supporting structure to rotate about a fixed hinge axis; the assembly also comprising cooling means for feeding pressurized cooling air into said intermediate chambers; and the assembly being characterized in that each said supporting arm is hollow and defines an inner chamber having an outlet communicating with the relative said intermediate chamber, and an inlet formed through an outer lateral wall of said supporting arm and extending in a cooling air inflow direction parallel to said fixed hinge axes.

BRIEF DESCRIPTION OF THE DRAWINGS

A number of non-limiting embodiments of the invention will be described by way of example with reference to the accompanying drawings, in which:

FIG. 3 shows a section along line III-III in FIG. 1.

DETAILED DESCRIPTION OF THE INVENTION

Figure 1:
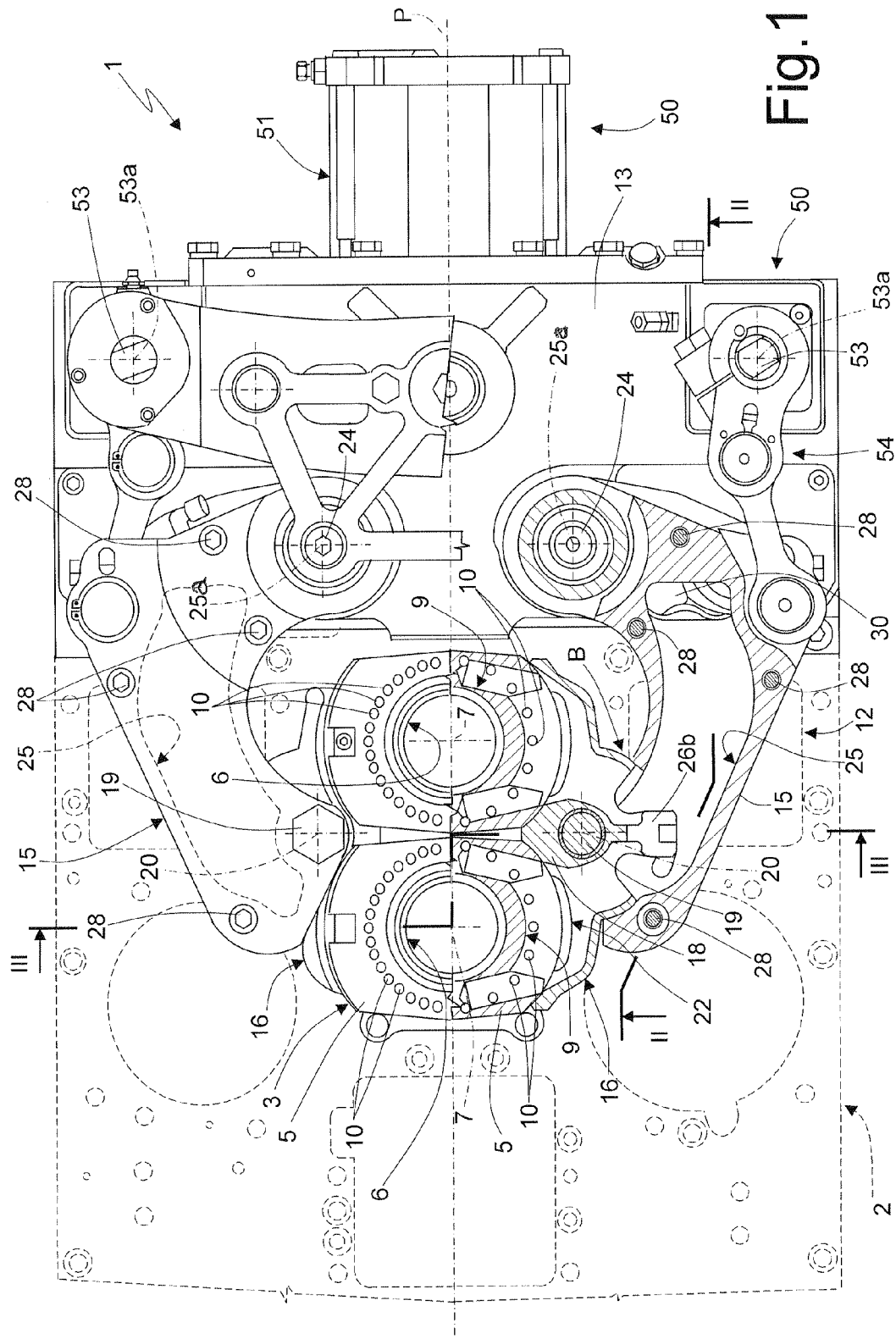
FIG. 1 shows a plan view, with parts removed for clarity, of a preferred embodiment of the mold actuating and cooling assembly according to the teachings of the present invention and located over a bed of a glassware molding machine.

Number 1 in the attached drawings indicates as a whole a glassware molding machine (shown partly) commonly known as an I.S. machine. Machine 1 comprises a bed 2 (shown partly); and a rough mold 3 extending over bed 2 and having a vertical plane P of symmetry. Mold 3 in turn comprises two half-molds 5 located on opposite sides of plane P and normally defining a number of side by side cavities 6 having respective axes 7 of symmetry in plane P. With reference to FIGS. 1 and 3, each half-mold 5 comprises an intermediate lateral chamber 9 formed at a distance from the bottom varying between a third of and half the height of mold 3; and two rings of through cooling holes 10 parallel to axis 7, and the inlets of which communicate with intermediate chamber 9. Half-molds 5 are movable, with respect to each other and bed 2, between a closed position (FIG. 1) defining cavities 6, and an open position to remove the semifinished articles, by a mold actuating and cooling assembly 12.

Figure 2:
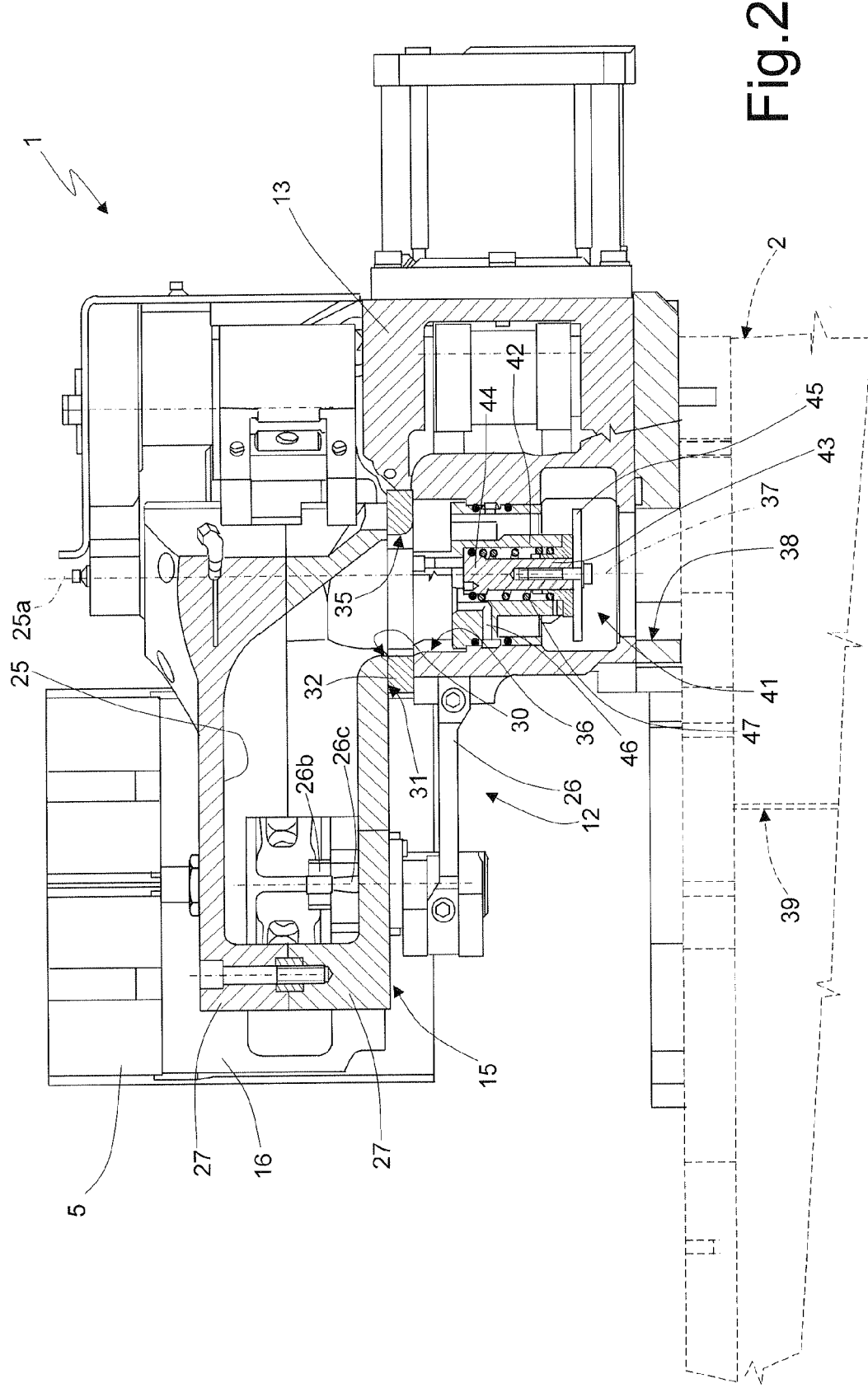
FIG. 2 shows a section along line II-II in FIG. 1.

As shown in FIG. 2, assembly 12 comprises a hollow supporting and connecting structure 13 connected releasably to bed 2 of machine 1, and which extends upwards from bed 2 and partly on either side of mold 3 (FIG. 2).

With reference to FIG. 1, assembly 12 also comprises, for each half-mold 5, a respective supporting and actuating arm 15; and a rocker arm mold holder insert or member 16 which is connected releasably to relative half-mold 5, and comprises an intermediate portion 18 (FIG. 1) hinged to arm 15 by a hinge pin 19 to oscillate with respect to arm 15 about a respective movable hinge axis 20 parallel to axis 7. Each insert 16 is hollow and defines, for each half-mold 5, a cavity 22 (FIG. 1) communicating permanently in fluidtight manner with intermediate chamber 9 of relative half-mold 5.

Each supporting and actuating arm 15 is L-shaped, and has an end portion, opposite the end portion hinged to relative mold holder insert 16, hinged to supporting structure 13 by a respective hinge pin 24 to rotate about a respective fixed hinge axis 25a parallel to movable axis 20. Pins 24 are located on opposite sides of plane P of symmetry, and at such a distance from plane P of symmetry that, when half-molds 5 are in the closed position, axes 20 and 25a are more or less the same distance from plane P, as shown in FIG. 1.

Each arm 15 is hollow, and defines internally a chamber 25 which communicates permanently in fluidtight manner with chamber 22 of relative mold holder insert 16 via a cylindrical arm-insert joint B (FIG. 1), and with relative intermediate chambers 9 via chamber 22.

The angular position of each insert 16 with respect to relative arm 15 is governed constantly by a connecting rod 26 (FIG. 2) hinged at one end to structure 13, and connected at the other end to an appendix 26b of relative insert 16. Appendix 26b is integral with intermediate portion 18, projects inside relative chamber 25 via cylindrical joint B, and is connected to connecting rod 26 by a rod 26c moving parallel to itself (FIG. 1).

With reference to FIGS. 2 and 3, each arm 15 is defined by two half-shells 27, which are superimposed in a direction parallel to axes 20, 25a, are joined in fluidtight manner in a plane K perpendicular to plane P and axes 20, 25a, and are tightened to one another by a number of screws 28 (FIG. 1).

With reference to FIG. 2, each chamber 25 has an inlet 30 which extends, parallel to axis 25a and eccentrically or transversely offset with respect to axis 25a, through one of the portions of relative arm 15 and, in particular, roughly halfway along the portion hinged to supporting structure 13 by pin 24. More specifically, inlet 30 extends through a flat outer lateral surface 31 of arm 15 (FIG. 2), which surface extends perpendicularly to axes 25a and slides in fluidtight contact with a flat interface plate 32 connected integrally in known manner to structure 13 and of a thickness depending on the type of mold 3. Each plate 32 has a wide opening 35 which communicates permanently with relative inlet 30 and defines an outlet of a pressurized cooling air feed passage 36 (FIG. 2) extending along an axis 37 parallel to axes 25a, and which has an inlet 30 communicating with a pressurized air chamber 39 inside bed 2. Each passage 36 has an airflow section larger than the corresponding opening 35, and houses a respective normally-open, on/off shutter valve 41 (FIG. 2). More specifically, each valve 41 comprises a connecting body 42 locked in fluidtight manner inside relative passage 36; and a rod 43 movable parallel to axis 37 and terminating at one end with a piston 44 and, at the other end, with a shutter body 45. Piston 44 defines, inside body 42, a variable-volume chamber into which a pressurized work fluid is fed, in use, along a conduit 46 to overcome the resistance of a return spring 47 and move shutter body 45 from a stable rest position opening passage 36, to a forward closed position in which shutter 45 closes passage 36.

With reference to FIG. 1, arms 15 are oscillated about respective fixed hinged axes 25a, to move half-molds 5 between the open and closed positions, by an actuator assembly 50 forming part of assembly 12. Actuator assembly 50—which is described in detail in Italian Patent Application n. TO2007A000090 filed on 7 Feb., 2007 by the present Applicant, and to the pertinent parts of which full reference is made herein for the sake of clarity—comprises a single pneumatic, double-acting, linear actuator 51, which projects outwards of structure 13 and activates a lever transmission (not shown), housed inside structure 13, to rotate a respective pair of torsion shafts 53, parallel to axes 25a, about respective axes 53a. For each arm 15, assembly 50 also comprises a connecting rod-crank assembly 54.

In actual use, regardless of the angular position of arms 15, valves 41 in the rest position allow cooling air to flow through passage 36, inlet 30, chamber 25, and chamber 22 to chambers 9 of half-molds 5, and in opposite directions from chambers 9 into holes 10 of half-molds 5.

As will be clear from the above description, mold actuating and cooling assembly 12 is highly compact, while at the same time being easy to produce and requiring no particular monitoring or maintenance. Compared with known solutions, in fact, assembly 12 comprises few relatively-moving parts.

As regards adjustment alongside changes in the size of the molds, using hollow inserts 16 and half-molds with intermediate chambers 9 greatly reduces the amount of adjustment required, by virtue of the size of chamber 22, and therefore of its outlet, allowing use of different molds, while still allowing the inside of inserts 16 to communicate perfectly with chambers 9 of half-molds 5. In the event of substantial differences in mold sizes, airflow to the molds is still ensured by simply changing the insert, which can obviously be done extremely easily by simply removing hinge pins 19 and disconnecting rod 26c.

Assembly 12 is obviously also extremely sturdy and therefore highly reliable. More specifically, the particular location of inlets 30 of chambers 25 provides for forming a strong base by which to hinge arms 15 to supporting structure 13, and which, together with an equally strong hinge pin, ensures precise, consistent movement.

As compared with known solutions, assembly 12 as described also operates much more efficiently, by virtue of featuring hollow arms and inserts, which greatly reduce load losses and, hence, resistance to air flow. In other words, the fact that both the arms and inserts are hollow enables the formation of ample air chambers close to the molds and, hence, the availability of a large mass of cooling air at uniform pressure immediately upstream from the inlets of holes 10 and, more importantly, close to the centre of the molds where the glass gobs impact and so heat the molds to a greater extent.

Moreover, having relatively large airflow sections, as compared with those of known assemblies, enables a considerable reduction in compressed-air supply pressure with respect to known solutions. Tests in fact show that pressures as low as 0.15 bars are sufficient to ensure constant airflow through the various passages, and effective cooling of the molds. In other words, the ample airflow sections enable air, in particular low-pressure air, to be used as coolant.

Clearly, changes may be made to assembly 12 as described herein without, however, departing from the protective scope as defined in the accompanying Claims. In particular, both arms 15 and inserts 16 may differ geometrically from those described, e.g. to meet particular geometric or functional requirements of one or more component parts of the machine, and may be hinged to the supporting structure at points and by means other than those indicated by way of example. Likewise, the arms may obviously be moved between the open and closed positions by actuating devices other than those described.

The invention claimed is:

1. An actuating and cooling assembly for a mold of a glassware molding machine, the mold comprising two half-molds, each of which has a number of through cooling conduits and defines an annular intermediate chamber communicating with respective inlets of said cooling conduits; the assembly comprising a supporting structure, and actuating means for moving the half-molds with respect to each other between a closed position and an open position; said actuating means comprising, for each said half-mold, a respective supporting and actuating arm connected to the relative half-mold and hinged to the fixed supporting structure to rotate about a fixed hinge axis; the assembly also comprising cooling means for feeding pressurized cooling air into said intermediate chambers; and the assembly being characterized in that each said supporting arm is hollow and defines an inner chamber having an outlet communicating with the relative said intermediate chamber, and an inlet formed through an outer lateral wall of said supporting arm and extending in a cooling air inflow direction parallel to said fixed hinge axes; wherein said outer lateral wall is bounded by an outer first flat surface perpendicular to said fixed hinge axes; the outer said first flat surface cooperating in fluidtight manner with a corresponding second flat surface connected to said supporting structure; wherein said first and second flat surface cooperate in sliding manner as the relative said supporting arm rotates about said fixed hinge axis.

2. An assembly as claimed in claim 1, further comprising an interface member with a hole, interposed between the flat surface of said supporting arm and said supporting structure; said interface member with a hole being bounded by said second flat surface.

3. An assembly as claimed in claim 1, wherein said inlet communicates with a relative air feed conduit formed in said supporting structure and located eccentrically with respect to the relative said fixed hinged axis.

4. An assembly as claimed in claim 3, wherein said air feed conduit extends at least partly in said cooling air inflow direction.

5. An assembly as claimed in claim 3, further comprising, for each said half-mold, respective on/off valve means for regulating cooling airflow to said inlet.

6. An assembly as claimed in claim 5, wherein said on/off valve means are housed in said air feed conduit.

7. An assembly as claimed in claim 5, wherein said on/off valve means comprise normally-open shutter means.

8. An actuating and cooling assembly for a mold of a glassware molding machine, the mold comprising two half-molds, each of which has a number of through cooling conduits and defines an annular intermediate chamber communicating with respective inlets of said cooling conduits; the assembly comprising structure, and actuating means for moving the half-molds with respect to each other between a closed position and an open position; said actuating means comprising, for each said half-mold, a respective supporting and actuating arm connected to the relative half-mold and hinged to the fixed supporting structure to rotate about a fixed hinge axis; the assembly also comprising cooling means for feeding pressurized cooling air into said intermediate chambers; and the assembly being characterized in that each said supporting arm is hollow and defines an inner chamber having an outlet communicating with the relative said intermediate chamber, and an inlet formed through an outer lateral wall of said supporting arm and extending in a cooling air inflow direction parallel to said fixed hinge axes; wherein each said supporting arm comprises two shells connected in fluidtight manner to each other and defining the relative said chamber.

9. An assembly as claimed in claim 8, wherein each said shell has a respective flat surface mating with the other shell and perpendicular to said fixed hinge axis.

10. An actuating and cooling assembly for a mold of a glassware molding machine, the mold comprising two half-molds, each of which has a number of through cooling conduits and defines an annular intermediate chamber communicating with respective inlets of said cooling conduits; the assembly comprising a supporting structure, and actuating means for moving the half-molds with respect to each other between a closed position and an open position; said actuating means comprising, for each said half-mold, a respective supporting and actuating arm connected to the relative half-mold and hinged to the fixed supporting structure to rotate about a fixed hinge axis; the assembly also comprising cooling means for feeding pressurized cooling air into said intermediate chambers; and the assembly being characterized in that each said supporting arm is hollow and defines an inner chamber having an outlet communicating with the relative said intermediate chamber, and an inlet formed through an outer lateral wall of said supporting arm and extending in a cooling air inflow direction parallel to said fixed hinge axes; wherein said actuating means comprise, for each said half-mold, a respective mold holder fitted to the relative said supporting arm to rotate about a movable hinge axis parallel to said fixed hinge axis, and connected integrally to the relative said half-mold; said mold holder defining a chamber connected in fluidtight manner to said outlet and to the intermediate chamber of the relative said half-mold.

* * * * *